Sept. 2, 1952     W. F. O'GORMAN     2,608,778
MOVING SIGN
Filed March 16, 1949     2 SHEETS—SHEET 2
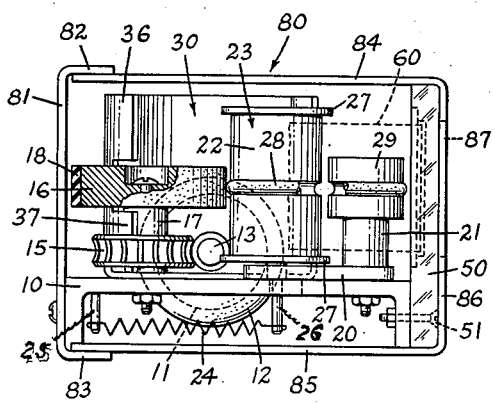
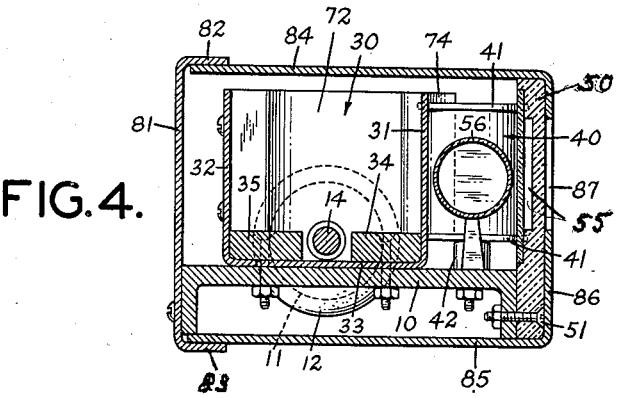
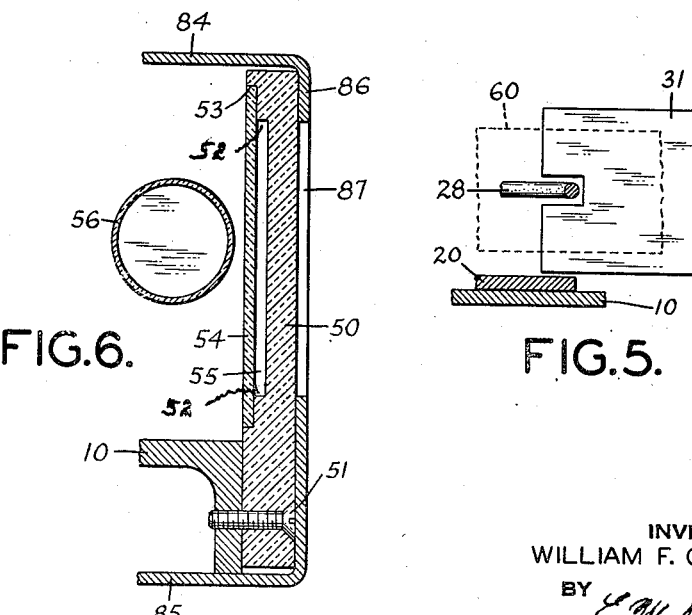
INVENTOR.
WILLIAM F. O'GORMAN
BY
E. W. Marshall
ATTORNEY.

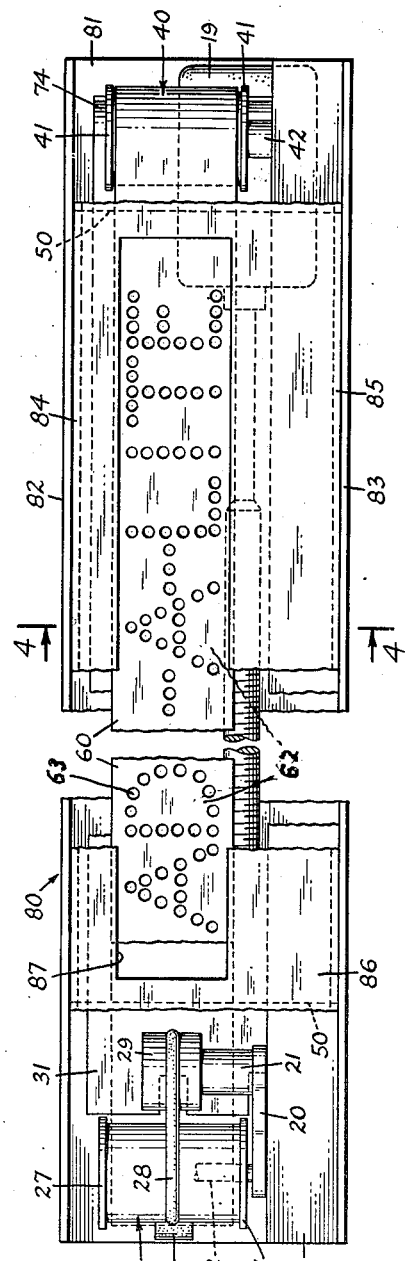
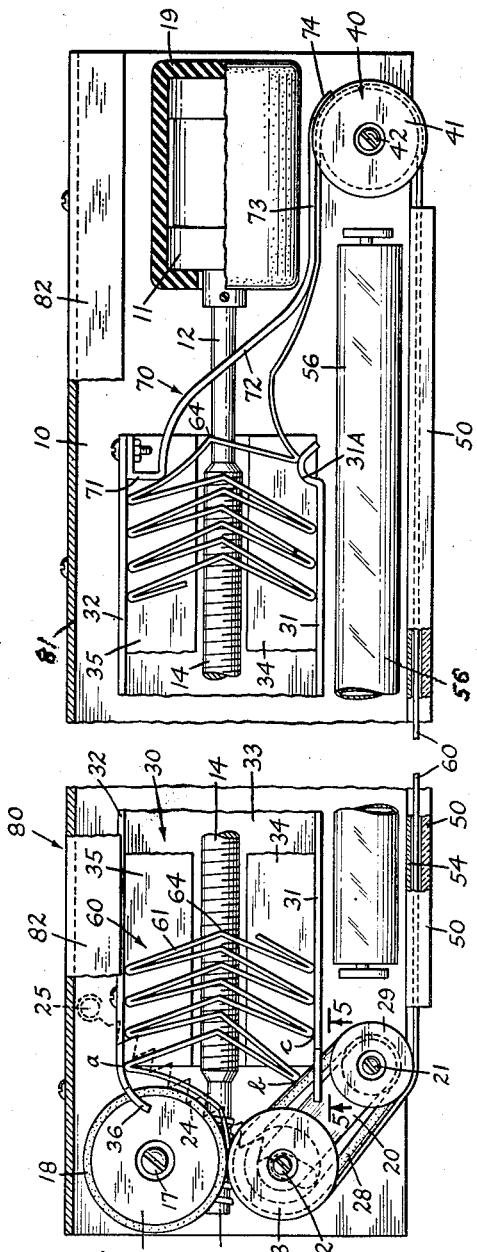

UNITED STATES PATENT OFFICE 2,608,778

MOVING SIGN

William F. O'Gorman, New York, N. Y., assignor to Adolite Mfg., Inc., Flushing, N. Y., a corporation of New York Application March 16, 1949, Serial No. 81,825

7 Claims. (Cl. 40—32)

This invention relates to improvements in moving signs of the type which have a stationary panel and an endless movable band which is visible through an opening in the panel.

Its object is to provide a compact device of simple construction for producing changing displays. Another object is to provide an arrangement whereby a band of maximum length may be used in a comparatively small device. More specifically, its object is to move a portion of an endless band continuously across a visible path and to move simultaneously through another path the greater part of the band in a folded compact condition. Still more specifically, its object is to provide an endless band composed of a plurality of sections of equal length or a continuous piece of material creased laterally on equally spaced lines and arranged to be folded alternately between adjacent sections, and to provide mechanism for moving a part of the band with the sections thereof in substantial alinement across a visible path and for moving the greater part of the band with its sections folded together through another path—preferably one parallel to the visible path. As shown herein, each of the sections may be bent on tranverse lines between the juncture of the sections or between the alternate folds in the band.

These and other objects will appear in the following specification, in which I will describe an embodiment of the invention and in which its novel features will be set forth in claims.

This application is a continuation-in-part of an application which I filed on March 13, 1948 as Serial Number 14,719, now abandoned.

In the drawings—

Fig. 1 is a front elevation of a moving sign made according to and embodying my invention. Portions of the cover are removed in this figure to show parts of the operating mechanism.

Fig. 2 is a plan view of the device shown in Fig. 1, with most of the cover omitted.

Fig. 3 is an end elevation of the parts shown in Fig. 2, with the band removed and with some of the parts broken away and shown in section.

Fig. 4 is a transverse sectional elevation of the parts shown in the preceding figures. This section is taken on the line 4—4 in Fig. 1;

Fig. 5 is a sectional front elevation taken on the line 5—5 of Fig. 2; and

Fig. 6 shows some of the parts shown in Fig. 3 on a larger scale.

10 designates a base, upon which the other parts of the apparatus are mounted. 11 is a motor mounted near one end of the base. 12 is a horizontal shaft, which extends from the motor to a worm 13 near the other end of the base. 14 is an enlarged externally threaded intermediate part of the shaft 12, which functions as a conveyor for the folded sections of the band, as will appear more fully hereinafter. 19 is a jacket of sponge rubber or the like which surrounds the motor and serves as a sound absorber.

The worm 13 engages a worm gear 15 on a drive pulley 16 rotatably supported on a vertical post 17 on the base 10. A tire 18 of resilient materials surrounds the pulley 16.

20 is a plate pivotally mounted on a post 21 on the base 10. 22 is a vertical post spaced from the post 21 and affixed to the plate 20. A pressure pulley 23 is rotatably mounted on this post. 24 is a tension spring connected to a post 25 on the under side of the base 10 and to a lug 26, which projects from the plate 20 through a slot in the base. This spring pulls the plate toward the drive pulley. The pressure pulley has flanges 27 spaced apart a distance slightly greater than the width of the band 60, which will be described later, and has an intermediate groove for the reception of a belt 28 of resilient material. 29 is an idler pulley mounted on the post 21. It, too, is grooved to receive the belt 28.

30 is a U-shaped guide channel having flat parallel sides 31, 32 and a connecting base portion 33. 34, 35 are spaced tracks on the connecting portion 33 which are affixed to the base 10 and thus fasten the guide channel to the base. The upper surfaces of the tracks are flat and smooth and in a common horizontal plane slightly below the top of the threaded part 14 of the shaft which lies between them (Fig. 4). 40 is an idler pulley, having flanges 41, rotatably supported on a vertical post 42 on the base 10 near the end thereof opposite the post 21. The upper surface of the lower flange is substantially in the plane of the upper surfaces of the tracks 34, 35.

50 is a flat translucent panel, preferably formed of a plastic material. It may be tinted if desired. It is affixed to the base 10, as by screws 51. The back of the panel 50 is depressed to form spaced shoulders 52, 53. A flat translucent panel 54 fits between the shoulders 52, 53 and is cemented or otherwise affixed to the panel 50. An elongated flat slot 55 is formed between the panels 50, 54 and the shoulders 52, 53. This slot is open at its ends as the panels 50, 54 are shorter than the distance between the pulleys 29 and 40 and are spaced from these pulleys as shown in Fig. 2.

60 is an endless band, transversely creased alternately on equally spaced lines to form a plurality of sections 61. The creases bias the sections to fold alternately, as shown in Fig. 2.

A desired sequence of letters, figures or other desired insignia 62 are on the band. In the specific embodiment shown, the band may be of opaque material, and the insignia are formed by suitably placed perforations 63.

The band passes around the idler pulley 40, and thence through the groove 55, around the idler pulley 29, and thence to the pressure pulley 23. Between the pulleys 29 and 23 it may be engaged by the belt 28. The band then passes with the belt between the pressure pulley 23 and the drive pulley 16. The spring 24 forces the belt toward the pressure pulley and thus presses the band against the tire 18. Thus the band is driven so that the part of it which is in the slot 55 will be under tension and its sections drawn into alinement. The indicia on the band are visible through the panel 50. When the indicia are formed by perforations, a lamp 56 is placed back of this visible part of the band and the panel 50 acts as a light diffuser.

The drive pulley pushes the band into the guide channel 30. As one of its sections 61 emerges from its position between the tire 18 and the belt 28, it will be moved backward until one of its folds meets the back plate 32 of the guide channel, as shown at $a$ in Fig. 2. The end of this plate is cut away to clear the drive pulley, and inwardly curved parts of it, 36, 37, extend over and under the drive pulley. These parts lie back of the band and prevent it from wrapping around the drive pulley. This engagement of the fold at $a$ forces the next emerging fold against the belt 28, which carries it forwardly, as shown at $b$, until it engages the plate 31, as shown at $c$. The end of the plate 31 is cut away to clear the belt 28, as shown in Fig. 5.

The distance between the plates 31, 32 is considerably less than the length of the sections 61 of the band, consequently the latter buckle as they are forced into the guide channel. To facilitate this function, a crease 64 is formed in each section of the band intermediate the creases at the ends of the sections.

Fig. 2 illustrates how the sections 61 of the band successively become buckled and folded alternately into the guide channel 30 as they emerge from the drive pulley 16 and the belt 28, so that when they reach the enlarged threaded part 14 of shaft 12 their lower edges rest upon the tracks 34, 35 and upon the threaded part 14 of the shaft. The threads of the latter extend above the lower edges of the sections 61 and function as a conveyor to carry the folded sections through the guide channel 30. The shaft 12 may be slightly offset from the line of the creases 64 if the latter are in the center of the section 61.

A plate 70 is affixed to the side 32 of the guide channel in a position spaced from the drive pulley. This has a part 71, which projects laterally a short distance into the path of the folded sections, a part 72, which extends diagonally toward the wall 31, and a part 73, which is parallel to the walls 31, 32 and extends to the idler pulley 40 between its flanges 41 and passes against the part of the band which is on the pulley 40.

The end of the plate 31 is bent as at 31A to extend a short distance into the path of movement of the folded sections 61 of the band at a point substantially opposite the part 71 of the plate 70.

As the band 60 is pulled around the idler pulley 40, it becomes unfolded and its sections straighten out, as shown in Fig. 4, so that it enters the slot 55 between the panels 50, 54 in a straight line. The creases 64 in the sections facilitate this function.

The apparatus is enclosed in a cover 80 of sheet metal or other suitable material. This comprises a back-plate 81, which is affixed to the rear edge of the base 10. The upper and lower edges of this plate are bent forwardly to form flanges 82, 83. The rest of the casing is a box-like structure having a top 84, which fits under the flange 82, a bottom 85, which fits under the flange 83, and a front plate 86, which lies against the panel 50 and has an opening 87 somewhat shorter than the panel, which extends longitudinally across the panel. The casing also has ends which are permanently affixed to the opposite ends of the top, bottom and front plates, but are not shown in the drawings.

To show the capacity of this apparatus, the one from which the accompanying drawings are made is 2⅞" tall, 3⅝" wide, and has an overall length of 17¼". The opening 87 is 1⅛" wide and 12" long, and the endless band contained and operated within this small device is sixty feet long. This particular model is designed particularly for the purpose of displaying advertising material in taxicabs and other passenger vehicles.

Various modifications in construction, mode of operation, method and use of an invention may and do occur to others, especially after benefiting from knowledge of such a disclosure as that herein presented of the principles involved, but the invention itself is not confined to the present showing.

I claim:

1. A moving sign having a casing provided with an elongated opening in its front side, an endless band comprising a plurality of sections of equal length, a guide channel, a motor located back of one end of the opening, a driving pulley engaging the band located back of the other end of the opening, and mechanism including a threaded shaft extending through the channel from the motor to the pulley for driving the pulley to move the band in one direction across the opening in the casing with the sections of the band in mutual alignment, and to move the band in the opposite direction into the channel with its sections folded over one another, and with the lower edges of the sections in operative engagement with the threaded shaft.

2. In a moving sign having an elongated band comprising a plurality of interconnected sections of equal length, a guide channel having parallel vertical side walls spaced apart a distance less than the length of said sections, spaced parallel horizontal tracks within the channel, a threaded shaft between the tracks, a pair of pulleys at one end of the channel, means for forcing said pulleys toward each other with the band interposed between them, to push the sections of the band over one another between the side walls of the channel and onto the tracks therein, at least one of the pulleys being driven by said shaft.

3. A moving sign having a casing provided with an elongated opening in its front side, an endless band comprising a plurality of interconnected sections of equal length, a guide channel with parallel stationary spaced side walls with sections of the band folded over one another between said walls, a motor located back of one end of the opening, a driving pulley engaging the band located back of the other end of the opening, mechanism including a threaded shaft extending through the channel from the motor to the pulley for driving the pulley, to draw the band out of the motor end of the channel, to pull the band in one direction across the opening with the sections of the band in mutual alinement, and to fold the sections and move the folded sections into the space between the walls of the channel and onto the threaded shaft in the channel with the lower edges of the sections in engagement with the threads on the shaft.

4. A moving sign having a casing provided with an elongated opening in its front side, an endless band comprising a plurality of interconnected sections of equal length, a guide channel with parallel stationary side walls spaced apart a distance less than the length of said sections, a motor located back of one end of the opening, a driving pulley engaging the band located back of the other end of the opening, mechanism including a threaded shaft extending through the channel from the motor to the pulley for driving the pulley to draw the band out of the motor end of the channel, to pull the band in one direction across the opening with the sections of the band in mutual alinement, and to fold the sections of the band intermediate their ends and over one another and to move the folded sections into the space between the walls of the channel and onto the threaded shaft in the channel with the lower edges of the sections in engagement with the threads on the shaft.

5. A moving sign having a casing provided with an elongated opening in its front side, an endless band comprising a plurality of interconnected sections of equal length, a guide channel with parallel side walls spaced apart a distance less than the length of said sections, with sections of the band folded intermediate their ends and over one another between said walls, spaced abutments near one end of the channel, a motor located back of one end of the opening, a driving pulley engaging the band located back of the other end of the opening, mechanism including a threaded shaft extending through the channel from the motor to the pulley for driving the pulley to draw the band past the abutments out of the motor end of the channel, to pull the band in one direction across the opening under tension, with the sections of the band in mutual alinement, and to move the band in opposite direction into the space between the walls of the channel and onto the threaded shaft in the channel, with the sections of the band folded over one another.

6. In a moving sign, an elongated band comprising a plurality of interconnected sections of equal length adapted to be folded over one another, all of said sections being creased intermediate their ends to bend in one direction when the sections are folded, a guide through which a part of the band passes with its sections in mutual alinement, and a channel through which a part of the band passes with its sections folded over one another.

7. In a moving sign, an endless band subdivided by folds into a plurality of sections of equal length adapted to be folded over one another, all of said sections being creased intermediate their ends to bend in one direction when the sections are folded, a guide through which a part of the band passes with its sections in mutual alinement, and a channel through which a part of the band passes with its sections folded over one another.

WILLIAM F. O'GORMAN.

REFERENCES CITED

The following references are of record in the file of this patent:

UNITED STATES PATENTS

| Number | Name | Date |
| --- | --- | --- |
| 1,729,323 | Barker | Sept. 24, 1929 |
| 1,802,622 | Van Ness | Apr. 28, 1931 |
| 2,327,270 | Johnson | Aug. 17, 1943 |
| 2,540,469 | Archey | Feb. 6, 1951 |

FOREIGN PATENTS

| Number | Country | Date |
| --- | --- | --- |
| 693,695 | France | Sept. 1, 1930 |
| 745,828 | France | Feb. 27, 1933 |
| 766,787 | France | Apr. 23, 1934 |
| 963,056 | France | Dec. 19, 1949 |